United States Patent
Alarawi et al.

(10) Patent No.: US 12,258,518 B2
(45) Date of Patent: Mar. 25, 2025

(54) CONSOLIDATION OF CARBONATE-BASED FORMATION ROCKS WITH GROUND CALCIUM CARBONATE

(71) Applicant: SAUDI ARABIAN OIL COMPANY, Dhahran (SA)

(72) Inventors: Abeer Ateeq Alarawi, Khobar (SA); Nora Khalid Alsudairi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/326,907

(22) Filed: May 31, 2023

(65) Prior Publication Data
US 2024/0400887 A1   Dec. 5, 2024

(51) Int. Cl.
| C09K 8/575 | (2006.01) |
| C09K 8/57 | (2006.01) |
| E21B 33/13 | (2006.01) |
| E21B 43/26 | (2006.01) |

(52) U.S. Cl.
CPC ............ *C09K 8/575* (2013.01); *C09K 8/572* (2013.01); *E21B 43/26* (2013.01)

(58) Field of Classification Search
CPC ... C04B 2103/002; C04B 24/40; C04B 28/10; C04B 40/0231; E21B 41/005; E21B 41/0064; E21B 43/164; B01D 53/1475; B01D 53/62
See application file for complete search history.

(56) References Cited

U.S. PATENT DOCUMENTS

| 11,365,345 B2 | 6/2022 | Al-Jawad et al. |
| 2023/0105378 A1* | 4/2023 | Scarlata ............. B01J 31/182 |
| | | 106/823 |

FOREIGN PATENT DOCUMENTS

WO   2008119620 A1   10/2008

OTHER PUBLICATIONS

Hammes, F. et al. "Key roles of pH and calcium metabolism in microbial carbonate precipitation" Re/Views in Environmental Science & Bio/Technology 1: 3-7, 2002 (6 pages).
Ferreira Pinto, A. P. et al. "Consolidation of carbonate stones: Influence of treatment procedures on the strengthening action of consolidants" Journal of Cultural Heritage 13 (2012) 154-166 (17 pages).
Valentini F. et al. "Characterization of Calcium Carbonate Nanoparticles with Architectural Application for the Consolidation of Pietraforte" Analytical Letters, Taylor & Francis, May 11, 2021 (17 pages).
Peña, K. L. et al. "Structural basis of the oxidative activation of the carboxysomal g-carbonic anhydrase, CcmM" PNAS, Feb. 9, 2010 vol. 107 No. 6 2455-2460 (7 pages).

* cited by examiner

*Primary Examiner* — Zakiya W Bates
(74) *Attorney, Agent, or Firm* — Osha Bergman Watanabe & Burton LLP

(57) ABSTRACT

A composition for consolidating a carbonate-based formation includes a zinc metalloenzyme and calcium carbonate. A method for consolidating a carbonate-based formation to mechanically enhance the formation, includes injecting a fracture within the formation with the composition.

16 Claims, 1 Drawing Sheet

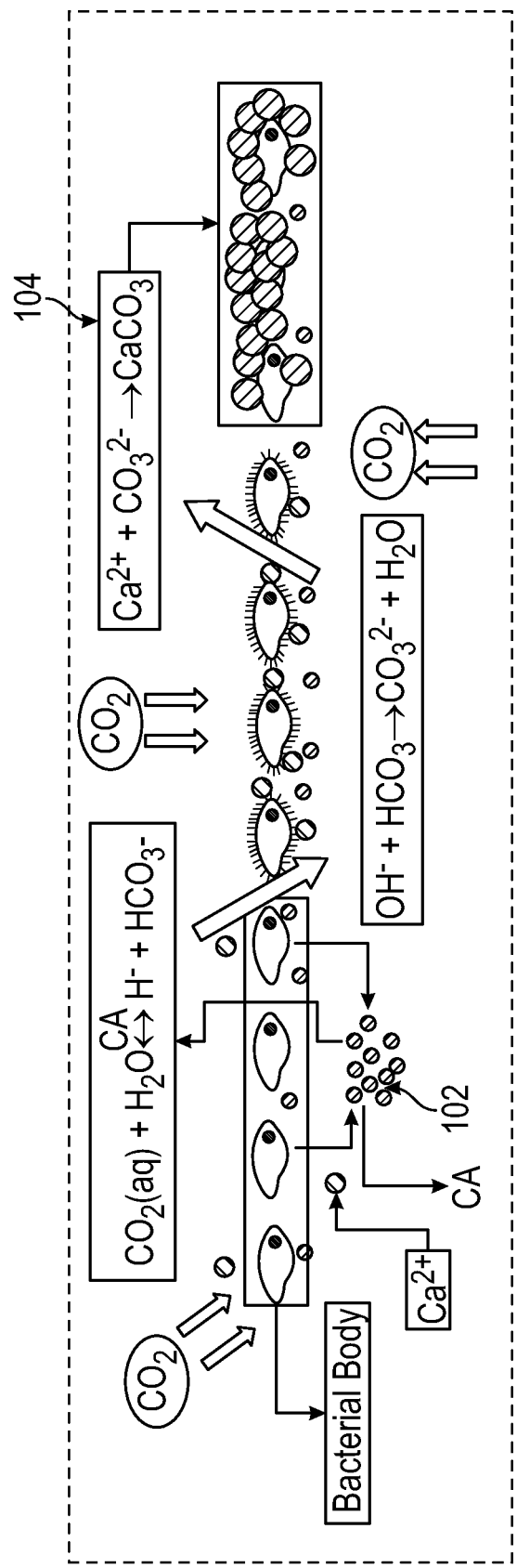

CONSOLIDATION OF CARBONATE-BASED FORMATION ROCKS WITH GROUND CALCIUM CARBONATE

BACKGROUND

The fracturing process in hydrocarbon production enhances formation conductivity by injecting dense fluids at high pressures to generate a fracture that will propagate deep into the formation. Proppant fracturing and acid fracturing are two main methods of fracturing. Proppant fracturing includes the use of sand or ceramic particles in injected fluids to hold and preserve the fractures. In acid fracturing, highly reactive acid, such as HCl, is injected to etch into the formation rock's surface and create asperities to prevent fracture closures when under stress.

During hydrocarbon production, applied stresses and elevated temperatures cause rock formation deformation. These conditions tend to lead to proppant embedment and asperities failures, which both decrease hydrocarbon production yield. Several methods exist to enhance carbonate formation strength to prevent this problem, including the use of chemical compounds, such as silicon compounds such as tetraethoxysilane, diammonium hydrogen phosphate, alkaline-earth metal hydroxide compounds, the process of bacterial carbonatogenesis, and mineral alteration, as additives to strengthen and repair fractures in formations.

Using silicon compounds is most common for strengthening the formation of rocks through the generation of amorphous silica during hydrolysis-condensation reactions; however, this method tends to cause poor bonding of alkoxysilanes to calcite rock. This can lead to cracks and shrinkage in the drying process.

Using diammonium hydrogen phosphate dissolves in water, significantly improves the mechanical properties of the rock, and its consolidation effect becomes visible within two days of treatment; however, it tends to perform poorly in high temperature conditions. The diammonium hydrogen phosphate forms several phosphate minerals in reaction to calcite depending on the initial concentration of the solution.

Alkaline-earth metal hydroxide nanoparticles have been used in cultural heritage preservation. The consolidating principle of these chemicals is based on in-situ generations of carbonate (carbonation) where the carbonation products and their crystallization rate depend on the relative humidity conditions. At high humidity conditions (75%-90%), the large amorphous and crystalline calcite crystals, such as monohydrocalcite [$CaCO_3 \cdot H_2O$], vaterite [$CaCO_3$], and aragonite [$CaCO_3$], form at a fast rate. In contrast, small-sized crystals of portlandite [Ca (OH) 2] form at a slower rate under low humidity (33%-54%) conditions.

Bacterial carbonatogenesis can strengthen carbonate rocks. However, the porosity and effectiveness tends to be negatively impacted at high temperatures when using this consolidation method. Carbonate rocks can be treated with mineral chemicals. However, these tend to leave unfortunate byproducts that may negatively influence the strength of the rock.

Mineral alteration exchanges the carbonate minerals for more stable and harder minerals. Examples of minerals used for mineral alteration include fluorite on the surface of calcite during a reaction with ammonium fluoride, hydrogen fluoride and sodium fluoride and zinc sulfate. Zinc sulfate increases the hardness of the formation more effectively than sodium fluoride. However, the permeability of the rock tends to deteriorate. While mineral alteration is possible if the product of the reaction has a solubility less than or equal to the parent calcite, strengthening the carbonate rock using a water solution of zinc chloride is ineffective due to the dissolution of the salt in water forming hydrogen chloride, which weakens the rock.

Accordingly, there exists a need for a composition that can enhance the mechanical characteristics of the rocks of a carbonate-based formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for consolidating a carbonate-based formation including injecting a fracture within a carbonate-based formation with a composition to mechanically enhance the carbonate-based formation. In another aspect, embodiments disclosed herein relate to a composition containing a zinc metalloenzyme and calcium carbonate.

Other aspects and advantages of the claimed subject matter will be apparent from the following description and the appended claims.

BRIEF DESCRIPTION OF DRAWINGS

FIG. 1 shows a reaction mechanism for carbonic anhydrase according to one or more embodiments of the present disclosure.

DETAILED DESCRIPTION

In one aspect, embodiments disclosed herein relate to a composition for consolidating a carbonate-based formation. The composition includes a zinc metalloenzyme and calcium carbonate. In another aspect, embodiments disclosed herein related to a method consolidating a carbonate-based formation. The method includes injecting a fracture within the carbonate-based formation with a composition and mechanically enhancing the carbonate-based formation with the composition. Mechanically enhancing includes increasing the elastic modulus, Poisson's ratio, rock strength, and rock hardness to reduce the fracture conductivity decline. Increasing the elastic modulus results in a rock that is more resistant to deformation. A high Poisson's ratio indicates that the rocks are harder to fracture. Rock strength indicates the pulling force required to rupture a rock sample over its cross-sectional area. Rock hardness is the resistance of earth material to permanent deformation, particularly by indentation or abrasion.

In one or more embodiments, the consolidating mechanism is based on transforming calcium carbonate ($CaCO_3$) particles to bond with the individual rock grains through bio-dissolution-precipitation reactions to alter the rock's mineralogy. The composition may resolve conductivity reduction issues in hydraulic fractures and aging due to formation rock softening that lead to proppant embedment and asperities failures. The methods and compositions are sustainable, compatible with the rock formation, and can successfully consolidate the formation without pore plugging.

Referring to FIG. 1, a reaction mechanism for carbonic anhydrase (CA) to form calcium carbonate is shown. The mechanism demonstrates carbonic anhydrase 102 and its role in facilitating the reaction to form calcium carbonate 104. In the reaction, CA catalyzes the reaction of carbon dioxide and water to form bicarbonate and hydrogen ions. This initial reaction is also called carbon dioxide hydration. The bicarbonate is reacted with hydroxide ions to form a carbonate ion and water. The carbonate ion is then reacted in the presence of calcium to form calcium carbonate.

In one or more embodiments, carbonic anhydrase is used as a catalyst for carbon dioxide hydration. Carbonic anhydrase has a reaction rate of approximately 106 reactions per second depending on the form of the enzyme and is stable in high temperature and pressure environments. Carbonic anhydrase is a zinc metalloenzyme that is typically involved in respiration, calcification, acid-base balance, and formation of fluids. Carbonic anhydrase is an example of lyase which assists in the breakdown reaction without hydrolysis. Carbonic anhydrase can aid in conversion of carbon dioxide and water into carbonic acid without hydrolysis. Additionally, carbonic anhydrase can endure typical reservoir conditions including high temperatures, pressure, pH, and salinity. Using carbonic anhydrase is beneficial because it converts carbon dioxide to calcium carbonate, reducing the carbon dioxide footprint in fracturing operations. Carbonic anhydrase is able to operate optimally at temperatures above about 50° C., such as within a fracture.

The source of the carbonic anhydrase (CA) may be a bacterial culture or a crude enzymatic solution. The carbonic anhydrase enzyme may be a carbonic anhydrase enzyme sourced from a bacterial culture such as *Sulfurihydrogenibium azorense*, known as SazCA. While SazCA is an α-CA, it shows faster carbonic anhydrase activity than any other α-CA.

Thermoactivity studies (V. De Luca, et al. An a-carbonic anhydrase from the thermophilic bacterium *Sulphurihydrogenibium azorense* is the fastest enzyme known for the CO2 hydration reaction, Bioorganic and Medicinal Chemistry 21, pp. 1465-1469 (2013), hereby incorporated herein by reference) demonstrated that carbonic anhydrase acts as an esterase in a temperature range of 0 to 100° C., with an optimal operating temperature of 80° C. SazCA is a carbonic anhydrase (CA). SazCA, identified by translated genome inspection in *Sulfurihydrogenibium azorense*, is a thermophilic bacterium from terrestrial hot springs of the Azores. SazCA is an α-CA, demonstrating kinetic parameters indicating that it is the fastest of the carbonic anhydrase family examined in these thermoactivity studies. The biochemical properties, thermostability, and inhibition of SazCA were compared with those of the thermophilic and mesophilic counterparts. The units of enzyme/mg against temperature were plotted for each of the three enzymes, SspCA, bCA II, and SazCA. The results demonstrate that SazCA is able to catalyze more efficiently than the other two enzymes at various temperatures, using less enzyme to facilitate the catalysis. The Wilbur Anderson Unit/mg of enzyme against temperature was plotted for each of the three enzymes, SazCA, SspCA, bCA II. The Wilbur Anderson unit is defined as a pH drop per minute within a solution. The results demonstrate that SazCA results in the fastest pH drop per minute, indicating its effectiveness on catalyzing the reaction than the other two enzymes. The data for SazCa demonstrate higher stability and a quicker reaction time over the other enzymes, indicating that SazCa is advantageous as a crystallized catalyst driver for cementing purposes.

In some embodiments, both carbonic anhydrase and another enzyme may be used in the catalysis reaction. For example, a synergistic role of urease (UA) and carbonic anhydrase in biomineralization of calcium carbonate in *Bacillus megaterium* may allow precipitation of $CaCO_3$ to be significantly faster in bacterial culture than in crude enzymatic solutions. Carbonic anhydrase plays a role in hydrating carbon dioxide to bicarbonate, while urease aids in maintaining the alkaline pH that promotes calcification process.

The calcium carbonate may be ground calcium carbonate and may be referred to as an additive. Ground calcium carbonate differs from precipitated calcium carbonate (PCC) in that ground calcium carbonate is formed directly from grinding limestone rock into a powder, while precipitated calcium carbonate is chemically produced through precipitation. The particle characteristics of ground calcium carbonate include a bulk density of 0.9-1.35 gm/cc and a specific surface area of 5-24 $m^2/g$. These particle characteristics help to increase the surface area per unit volume, leading to improved reactivity with formation rocks and penetration through the porous matrices. Strengthening the formation rocks with ground calcium carbonate simulates the mineral transformation within the formation that occurs in nature. Further, because the composition is compatible with the microstructural characteristics of carbonate formation rock, the penetration process is enhanced.

The ground calcium carbonate may be waste ground calcium carbonate that is reused from industrial applications. Ground calcium carbonate is used in several applications, including paper and plastic fillers, coatings, paints, and cement. Thus, for example, waste ground calcium carbonate may be reused from one or more of these processes. Ground calcium carbonate (GCC) is available commercially. For example, ground calcium carbonate is commercially available from Baker Hughes as MIL-CARB 600. The ground calcium carbonate may have a specific gravity in the range of 2.7 to 2.71 $g/cm^3$. The ground calcium carbonate may have a solubility of at least 96% in diluted hydrogen chloride and is in the form of a white powder. Because the solubility of ground calcium carbonate in substantially pure water is too low, at only 15 mg/L at 25° C. Thus, it is desirable to use another solvent in the composition to improve the solubility.

The composition may include a solvent. The solvent can play a role in the penetration process. It is desirable that the solvent has a volatility and viscosity that are sufficiently low to avoid ineffective penetration to proper depths within the formation. Additionally, a low eco-toxicological impact of the solvent is desirable to avoid formation damage. One exemplary solvent that meets these criteria is 1,4 Butanediol. 1,4 Butanediol is a colorless, water-miscible, viscous liquid at room temperature (22° C.). 1,4 Butanediol has a high boiling point relative to room temperature. Once combined, the viscosity of the overall composition may be in the range of about 35 centipoise (cP) to about 70 cP.

A process of treating a formation with the composition may be initiated after the formation has been treated with an acid fracturing treatment. Once the fracture location has been treated with acid, the final composition for consolidating a carbonate-based formation is combined prior to injection either in the field on location at the time of use, or may be prepared and stored in advance on location or off-site. The concentration of Ground Calcium Carbonate in the composition may range from 10-50 g/L.

The composition may be injected into a fracture to mechanically enhance the carbonate-based formation. Injection may occur from 25 to 180° C. (77 to 350° F.). The pressure during injection may range from 1000 to 10000 psi. The process of consolidation may occur over a range of 4 to 10 days, for example 7 days, once the injection has occurred for the formation to properly consolidate and adsorb onto the fracture surface. Because of the volatility and viscosity of the final composition, the composition is able to penetrate a porous network of the carbonate-based formation to reach the targeted fracture. The composition cures over time within the fracture, strengthening the formation.

Embodiments of the present disclosure may provide at least one of the following advantages. The composition enhances the mechanical characteristics of the carbonate-based formation rocks to combat any damage due to fracturing. The composition is a sustainable option that can reuse commercial byproducts to reduce waste streams from other processes. Because of this, the raw materials are lower cost relative to alternative processes using different compositions. Because of the low viscosity of the composition, the composition is able to penetrate deeper into the porous network than alternative technologies. Because of the simplicity of the composition, there are no additional additives that may cause formation damage.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed:

1. A method for consolidating a carbonate-based formation, comprising:
   injecting a fracture within the carbonate-based formation with a composition, the composition comprising:
   a zinc metalloenzyme;
   ground calcium carbonate; and
   a solvent comprising water and another solvent, wherein the solvent has a viscosity in a range of 35 to 70 centipoise;
   mechanically enhancing the carbonate-based formation with the composition.

2. The method of claim 1, wherein mechanically enhancing the carbonate-based formation comprises improving a characteristic of a rock within the carbonate-based formation.

3. The method of claim 2, wherein the characteristic is elastic modulus, Poisson's ratio, or rock strength.

4. The method of claim 1, wherein the zinc metalloenzyme comprises carbonic anhydrase.

5. The method of claim 1, wherein mechanically enhancing the carbonate-based formation comprises allowing the zinc metalloenzyme to promote dissolution-precipitation of the ground calcium carbonate.

6. The method of claim 1, wherein the zinc metalloenzyme is catalytically active to hydrate carbon dioxide under conditions in the carbonate-based formation comprising a temperature in the range of about 0° C. to about 100° C.

7. The method of claim 1, wherein the another solvent comprises 1,4-Butanediol.

8. The method of claim 1, wherein the method further comprises allowing the composition to penetrate a porous network of the carbonate-based formation.

9. A composition for consolidating a carbonate-based formation, comprising:
   a zinc metalloenzyme;
   ground calcium carbonate; and
   a solvent comprising water and another solvent, wherein the solvent has a viscosity in a range of 35 to 70 centipoise.

10. The composition of claim 9, wherein the zinc metalloenzyme comprises carbonic anhydrase.

11. The composition of claim 9, wherein the zinc metalloenzyme is catalytically active to hydrate carbon dioxide under conditions in the carbonate-based formation comprising a temperature in the range of about 0° C. to about 100° C.

12. The composition of claim 9, wherein a viscosity of the composition is in the range of 35 to 70 cP.

13. The composition of claim 9, wherein the ground calcium carbonate has a specific gravity in the range of 2.7 to 2.71 g/cm$^3$.

14. The composition of claim 9, wherein the ground calcium carbonate has a solubility of at least 96% in diluted HCl.

15. The composition of claim 9, wherein the ground calcium carbonate is in a form of a white powder.

16. A composition for consolidating a carbonate-based formation, comprising:
   a zinc metalloenzyme;
   calcium carbonate; and
   a solvent comprising 1,4-Butanediol.

* * * * *